United States Patent
Johnston

[11] Patent Number: 6,117,321
[45] Date of Patent: Sep. 12, 2000

[54] EXTERNAL TENSION ADJUSTMENT DEVICE FOR A FILTERING SLEEVE IN A FILTERING MACHINE

[76] Inventor: Robert Boyd Johnston, 2810 5th Ave., Tampa, Fla. 33605

[21] Appl. No.: 09/237,982

[22] Filed: Jan. 25, 1999

[51] Int. Cl.[7] .................................................. B01D 33/80
[52] U.S. Cl. ......................... 210/249; 210/351; 210/356; 210/497.01
[58] Field of Search .................................. 210/249, 250, 210/360.1, 369, 409, 497.01, 512.3, 512.1, 356, 351; 55/492

[56] References Cited

U.S. PATENT DOCUMENTS

| | | | |
|---|---|---|---|
| 4,632,753 | 12/1986 | Jacobsen et al. | 210/360.1 |
| 4,762,615 | 8/1988 | Drori | 210/356 |
| 5,736,039 | 4/1998 | Turchetti | 210/249 |
| 5,858,228 | 1/1999 | Turchetti | 210/249 |

OTHER PUBLICATIONS

Brochure "Waste 80 Turbo Filtro" by Mecatfiltracoes Industrias Ltds., Rod. Br–060 S/N, KM 213, CEP 74431–970 Goiania, Goias, Brazil ( No Date Given).
Brochure "Rotofilter" by Dontech, Inc., 76 Center Drive, Gilberts, IL 60136 (No Date Given).
Brochure "Russell Separator" by Russell Finex Inc. 10709–A Granite Street, Charlotte, NC 28273 (No Date Given).
Brochure "Fines Saver" by Stoelting Company, 502 Highway 67, Kiel, Wisconsin 53042 (No Date Given).
Brochure "Roto 25" by Separators, Inc., 747 E. Sumner Avenue, Indianapolis, IN 46227 (No Date Given).
Brochure "Sermia Filter" by Sermia International Inc. 771 Blvd. Industriel, Blainville, QC, Canada j7c 3v3 (No Date Given).
Reference Only: Brochure, "Fiber Filter" by Vincent Corporation Showing This Inventor's Machine (No Date Given).

*Primary Examiner*—David A. Simmons
*Assistant Examiner*—Frank M. Lawrence

[57] ABSTRACT

An adjustable elastic support is provided for a filtering sleeve. A tilting body 1 has one extremity with an inlet 2. A filter unit 3 is lodged inside the body 1. The lower portion of the body 1 is provided with an outlet 5 for the filtrate. An outlet 6 for solids of the filtration process is also provided. The tilting body 1 is assembled on a frame 7 through a pivot 8 and an inclination regulation device 9. The filtering unit 3 includes a filtering sleeve 10 operated conjunction with a rotor 11. Sleeve 10 is assembled on the filtering unit 3 through supports 12, 19 and 22. The supports 12 and 19 are movable and are associated with a tension adjusting device 21.

1 Claim, 1 Drawing Sheet

EXTERNAL TENSION ADJUSTMENT DEVICE FOR A FILTERING SLEEVE IN A FILTERING MACHINE

BACKGROUND—FIELD OF THE INVENTION

The present invention relates to an improvement in the elastic support of the filtering sleeve of a filtering machine.

BACKGROUND—DISCUSSION OF PRIOR ART

There exists a class of filtration machines which operate by admitting the inbound liquid flow into a cylindrical filter sleeve assembly. The filtering sleeve is used in the separation of suspended solids from fluids. Fine filtration of heavy flows is achieved by inducing pulsation in the filtering sleeve. The action between an internal rotor and the liquid being filtered is what causes pulsation of the filter sleeve. The pulsation prevents the filtering sleeve from becoming blinded with solids, and further induces heavy flow of filtrate through the filter sleeve.

Such filtering machines include an elastic support for the filtering sleeve (or sleeve segments), which support is provided to allow vibration associated with pulsing the filtering sleeves. The elastic support allows sleeve movement during stresses inherent with the filtering process, and it further allows tension to be maintained despite permanent elongation of the sleeve caused by stretching.

The elastic support of these filtering machines includes two fixed extremity flanged rings which are assembled at either end of the filter body and interconnected by structural rods. There is also provided a sliding and flanged ring positioned adjacent to one of the fixed extremity flanged rings. If the elastic support contains more that one filter sleeve, intermediate movable flanged rings are disposed between adjacent filter sleeves. The aforesaid movable flanged rings are assembled slidably and movably on the structural rods.

One of the extremities of the filtering sleeve or its segments is assembled on a fixed flanged extremity ring. The other extremity of the filtering sleeve or sleeve segment is fixed to the movable end flanged ring. This movable extremity ring is telescoping in the respective fixed flanged extremity ring. The movable flanged extremity and intermediate rings are arranged to allow tensioning the respective filter sleeve segments. Tensioning is achieved with devices such as springs, turnbuckles or air cylinders.

U.S. Pat. Nos. 5,736,039 and 5,858,228 describe arrangements for tensioning filter sleeves. Note that these call for springs and threaded rods to be located in the flow of filtered liquid.

There are two significant problems with this technology. The sanitary characteristics and cleanability of the machine are poor because the tensioning mechanism is located in the flow of filtered liquid. Furthermore, tension adjustment cannot be made without interrupting the machine's operation and removing the entire sleeve assembly.

SUMMARY OF THE INVENTION

One object of the present invention is to solve the above-described sanitation problem. The present invention accomplishes this by locating the elastic support and tension adjusting devices on the outside of the machine.

Another object of the present invention is to solve the adjustment problem, and to substantially improve the filtering operation and assure the integrity of the filtering sleeve by permitting the sleeve tension to be adjusted with the machine in operation.

DESCRIPTION OF THE INVENTION

Figure 1:
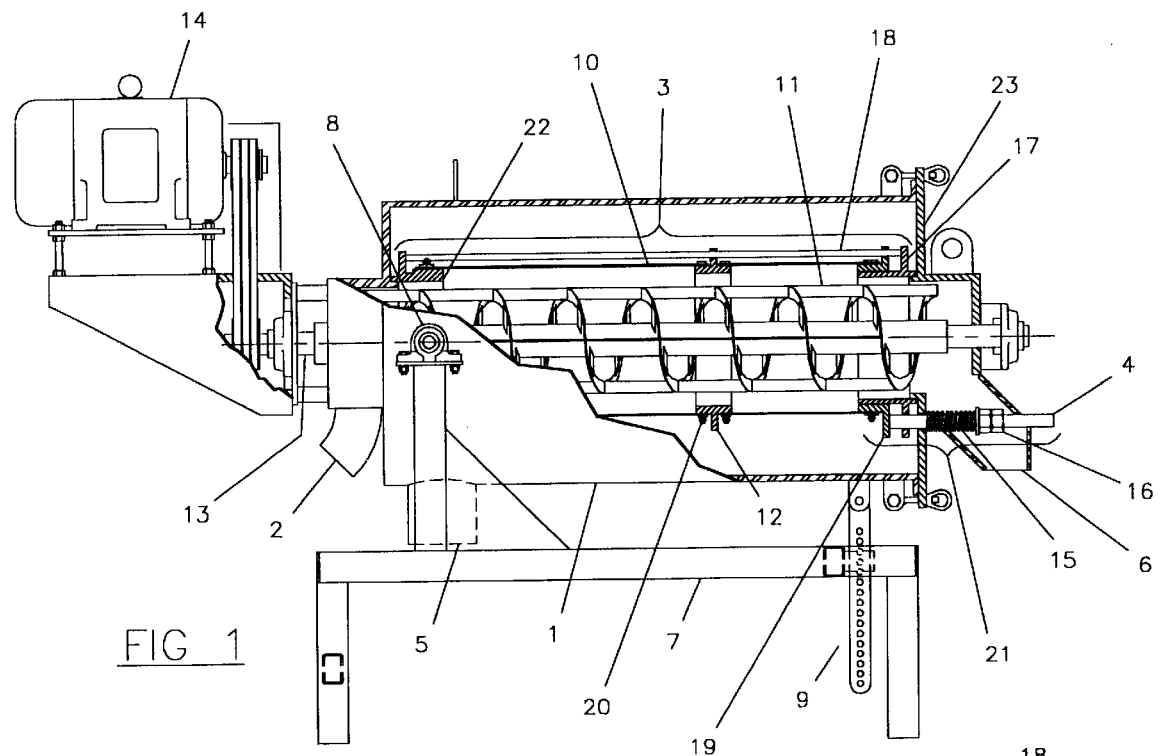
FIG. 1 shows a schematic side view of a filtering machine using an elastic support in accordance with a preferred embodiment of the present invention.
Figure 2:
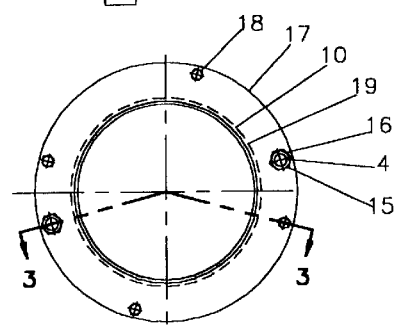
FIG. 2 shows the elastic support viewed from one of its extremities.

With reference to the accompanying drawings, there is shown a filtering machine using an elastic support. As shown in FIG. 1, the separating filter machine is of the type which includes a tilting filter body 1, having a feeder opening 2 for admitting the product to be filtered. The tilting filter body 1 is provided internally with a filtering unit 3.

The tilting filter body 1 is supported on a frame 7 by means of pivoting linkages 8. A tilting regulation device 9 is provided at the solids outlet 6 extremity.

The filter body 1 is provided, on it lower side, with an outlet 5 for the filtrate.

At the end of the filter body 1 which is remote from the extremity having the feeder opening 2, there is provided a discharge head 23 with an outlet 6 for the solids resulting from the filtering process.

The filtering unit 3 is composed of a filtering screen sleeve 10 which operates in conjunction with a rotor 11. The screening medium, in the form of a sleeve 10, is assembled on the filtering unit 3 by means of supports 12, 19, and 22. The inlet of the sleeve 10 is disposed close to the inlet 2 of the filter body 1. The paddle and helicoid portion of the rotor 11 is disposed inside of the filter sleeve 10. The other extremity of the filtering sleeve 10 is located close to the solid outlet 6 of the discharge head 23.

The rotor 11 includes a shaft 13 which is coupled to a motor assembly 14 disposed outside the filter body 1. The paddles and helicoid flights of the rotor 11 are disposed around the shaft 13.

The present improvements comprise external tension adjustment 21 providing tensioning rods 4 attached to the movable flanged extremity ring 19. They are attached in such a manner as to pass through openings in an end of the discharge head 23. Springs 15 are positioned around the tensioning rods, pressed between the discharge head 23 and corresponding pressure adjusting nuts 16. The nuts run on threaded portions of the tensioning rods.

This arrangement has the capability of maintaining the filtering sleeve 10 stretched and pulsing during filtering. This allows for contraction of the filtering sleeve 10 under larger than normal stress during filtering. It also provides a sanitary arrangement. It further permits tension of the filtering sleeve to be adjusted with the machine in operation.

Figure 3:
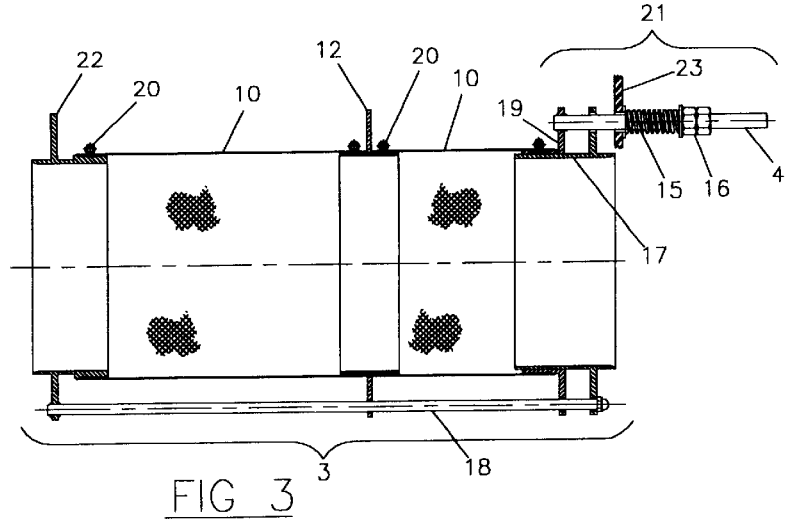
FIG. 3 illustrates a view taken along the line 3—3 shown on FIG. 2.

Thus, the elastic support applied to a one-piece filter sleeve 10 as shown in FIG. 3 comprises fixed flanged extremity rings 17 and 22 assembled on the filtering unit 3 and interconnected by structural rods 18. A movable flanged extremity ring 19 is disposed adjacent to one of the fixed flanged extremity rings 17 and is assembled slidably on the rods 18.

One of the extremities of the filtering sleeve 10 is assembled to the corresponding movable flanged extremity ring 19. The other extremity of the filtering sleeve 10 is assembled to the fixed flanged extremity ring 22. The movable flanged extremity ring 19 is telescopically movable relative to the fixed flanged extremity ring 17 adjacent thereto.

The movable flanged extremity ring 19 is positioned by elastic elements, preferably but not necessarily coil springs, assembled around the rods 4. One such elastic element may preferably, but not necessarily, comprise an extension spring 15 forcing the movable flanged extremity ring 19 into a position where the filtering sleeve 10 is stretched and positioned under tension. The nut 16 is screwed on threaded portion of the rod 4. The movable flanged extremity ring 19 is forced into position by tension of the filter sleeve acting against the distension force of the extension spring 15.

As a result during the filtering operation the filtering sleeve 10 is kept stretched by the movable flanged extremity ring 19. The ring is positioned where it stretches the sleeve, being in balance between the extension springs 15 and the tension of the filter sleeve. The sleeve is distended between the movable flanged extremity ring 19 and the fixed extremity ring 22.

When a pressure increase within the filtering sleeve 10 occurs, resulting from the dynamics of the filtering process itself, and causing a radial stress on the sleeve, the filtering sleeve 10 swells out and contracts axially. This causes the movable flanged extremity rings 12 and 19 to move axially on the rods 18 and against the force of the extension springs 15, which are thus compressed.

Once the overpressure within the filtering sleeve 10 has ceased, the extension springs 15 will extend and pull the movable flanged extremity rings 12 and 19 into the initial position. The return travel of the movable flanged extremity ring 19 is limited and smoothed by the tension of the filter sleeve 10. The fixed flanged extremity rings 17 and 22 are secured to the rods 18. The extremities of the filtering sleeve 10 are fixed to the flanged rings by means of appropriate clamps 20. The nuts 16 are threaded on rods 4 to provide more or less pressure on the extension springs 15 according to the filtering operation to be performed.

The present invention comprises embodiments wherein the filtering unit 3 with the external tension adjustment 21 may also be applied to filtering sleeves 10 which are not formed of one-piece, i.e., of the type formed by modules coupled to each other as shown in FIG. 1. In FIG. 1 the filtering sleeve 10 is composed of two modules.

While the present invention has been described with respect to certain preferred embodiments, it is to be understood that the invention is not limited thereto, but rather is susceptible of numerous changes and modifications which will occur to those skilled in the art. Consequently, the present invention is not to be limited to the details shown and described herein, but is intended to cover all such changes and modifications as are encompassed by the scope of the appended claims.

I claim:

1. A filtering apparatus, comprising:

a filtering body provided with a filter unit;

said filter unit including a flexible filtering sleeve and a rotor disposed within said filtering sleeve for pulsing fluids radially outwardly against said filtering sleeve;

said filtering sleeve being assembled on said filtering body by means of one or more supports;

said one or more supports are elastic and permit the filtering sleeve to expand and contract along a longitudinal axis thereof;

said elastic support or supports can be adjusted and tensioned by adjustment devices located outside of the flow of filtrate.

* * * * *